(12) United States Patent
Ding et al.

(10) Patent No.: US 11,759,945 B2
(45) Date of Patent: Sep. 19, 2023

(54) DUAL-OUTPUT-SHAFT SERVO AND ROBOT

(71) Applicant: UBTECH ROBOTICS CORP LTD, Shenzhen (CN)

(72) Inventors: Hongyu Ding, Shenzhen (CN); Yisen Hu, Shenzhen (CN); Jian Li, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 0 days.

(21) Appl. No.: 17/547,274

(22) Filed: Dec. 10, 2021

(65) Prior Publication Data

US 2022/0184799 A1 Jun. 16, 2022

(30) Foreign Application Priority Data

Dec. 11, 2020 (CN) .......................... 202011444264.8

(51) Int. Cl.
*B25J 9/12* (2006.01)
*B25J 9/10* (2006.01)
*B25J 13/08* (2006.01)

(52) U.S. Cl.
CPC .............. *B25J 9/102* (2013.01); *B25J 9/108* (2013.01); *B25J 9/126* (2013.01); *B25J 13/088* (2013.01)

(58) Field of Classification Search
CPC ... B25J 9/102; B25J 9/108; B25J 9/126; B25J 13/088
See application file for complete search history.

(56) References Cited

FOREIGN PATENT DOCUMENTS

| CN | 102862164 A | * | 1/2013 |
|----|-------------|---|--------|
| CN | 102862164 A |   | 1/2013 |
| CN | 102862166 A | * | 1/2013 |

OTHER PUBLICATIONS

Machine translation of CN102862166A. (Year: 2013).*

* cited by examiner

*Primary Examiner* — Randell J Krug (57) ABSTRACT

A dual-output-shaft servo includes a housing including two first sensors and two actuating mechanisms. Each actuating mechanism includes a motor assembly, a speed reduction mechanism opposite the motor assembly, and a transmission mechanism arranged between the motor assembly and the speed reduction mechanism. The speed reduction mechanism includes an output component, and a connection shaft is fixed to the output component. A first sensor counterpart is attached to an end of the connection shaft which faces the motor assembly. The transmission mechanism is to transmit mechanical power from the motor assembly to the speed reduction mechanism. The axes of rotation of the output components of the speed reduction mechanisms are skew or intersected with each other.

16 Claims, 5 Drawing Sheets

DUAL-OUTPUT-SHAFT SERVO AND ROBOT

CROSS REFERENCE TO RELATED APPLICATIONS

This application claims priority to Chinese Patent Application No. 202011444264.8, filed Dec. 11, 2020, which is hereby incorporated by reference herein as if set forth in its entirety.

BACKGROUND

1. Technical Field

The present disclosure generally relates to servos, and particularly to a servo having two output shafts.

2. Description of Related Art

In order to achieve various functions, some robots (e.g., humanoid robots) typically have multiple degrees of freedom. For example, the hip joint of a humanoid robot may have three degrees of freedom, and the ankle joint of a humanoid robot may have two degrees of freedom. Typically, the axes of rotation of these multi-degree-of-freedom joints intersect with one another. In order to realize the desired functions in a limited space, one conventional solution is to provide a single-output-shaft servo and a transmission mechanism for each rotational degree of freedom. The transmission mechanism can be a synchronous belt mechanism or a linkage mechanism, and the transmission mechanism is driven by a single-output-shaft servo to drive the corresponding rotating shaft to rotate, which increases cost, weight and system complexity.

Therefore, there is a need to provide a dual-output-shaft servo to overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views. Obviously, the drawings in the following description are only some embodiments of the present disclosure. For those of ordinary skill in the art, other drawings can be obtained based on these drawings without creative labor.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 1:
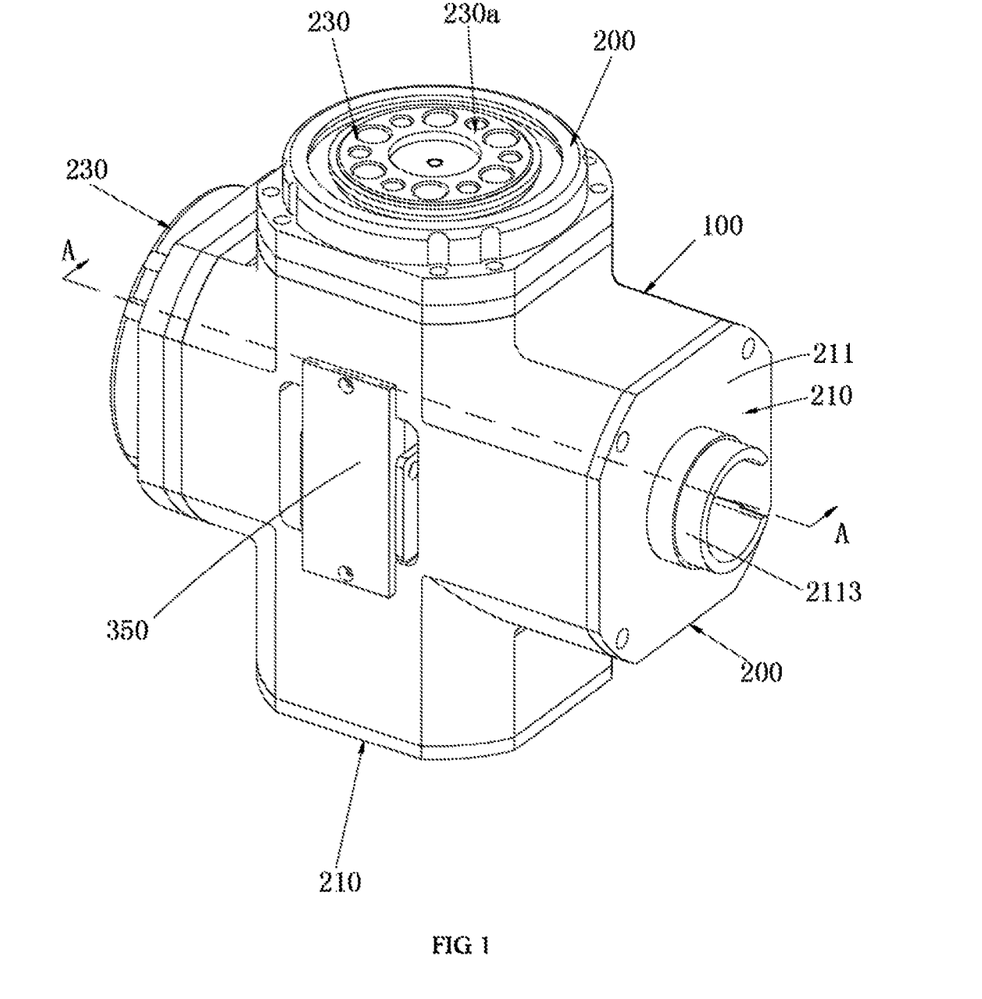
FIG. 1 is a schematic isometric view of a servo according to one embodiment.
Figure 2:
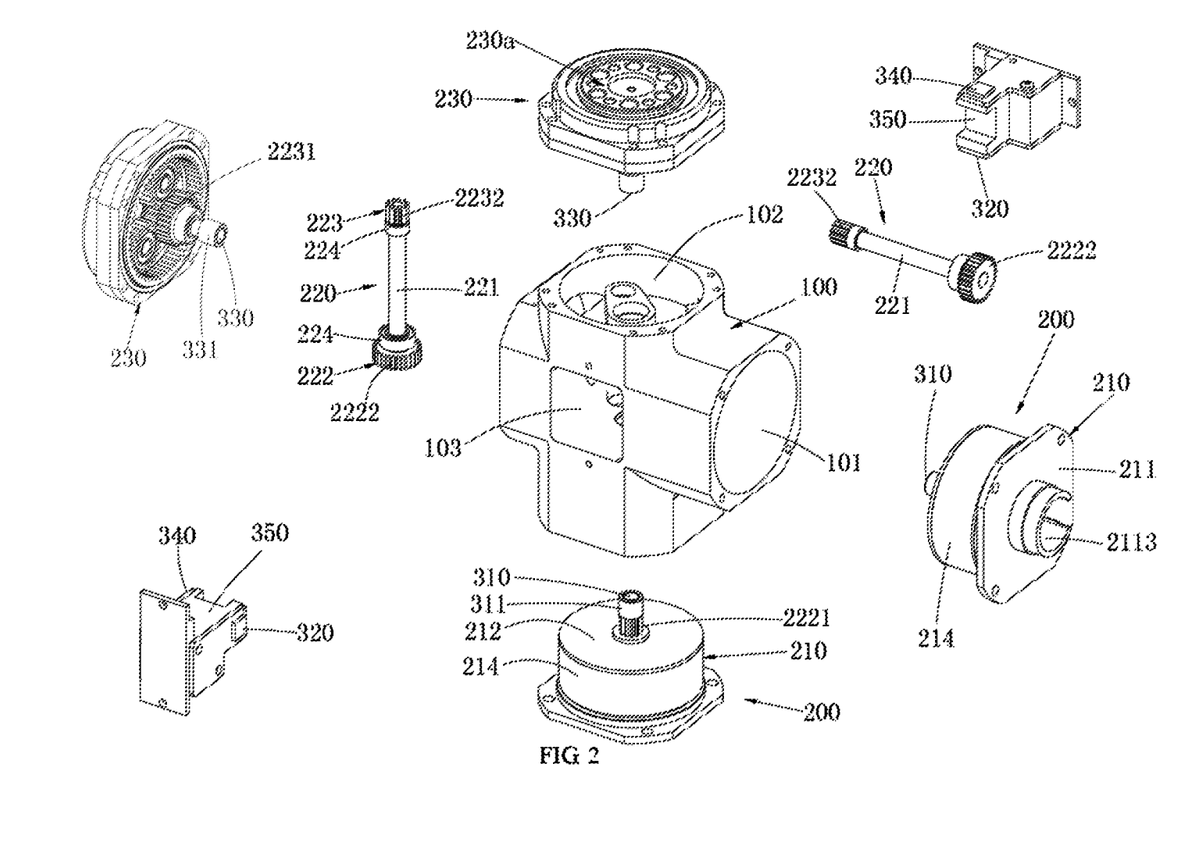
FIG. 2 is a schematic isometric exploded view of the servo of FIG. 1.
Figure 5:
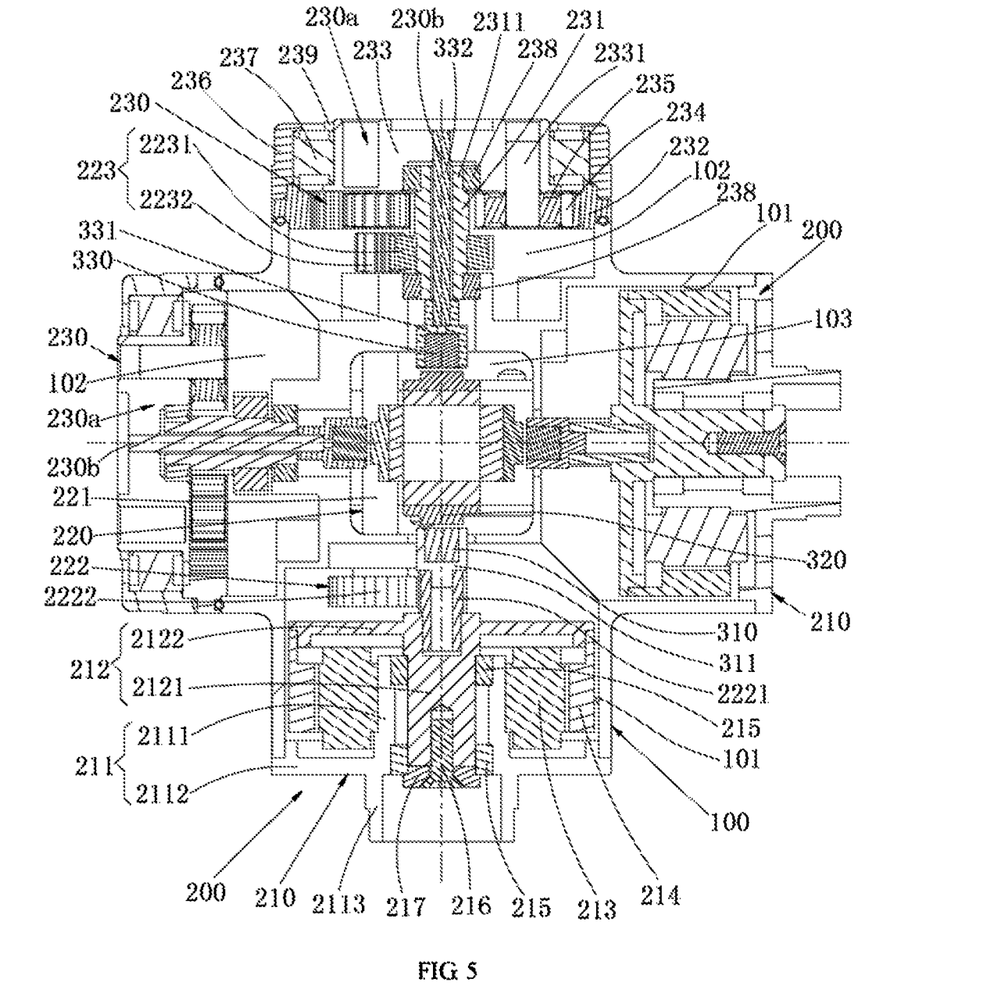
FIG. 5 is a cross-sectional view of the servo, taken along lines A-A of FIG. 1.

Referring to FIGS. 1 and 2, in one embodiment, a dual-output-shaft servo may include a housing 100 having two first sensors 340 and two actuating mechanisms 200. Each of the actuating mechanisms 200 may include a motor assembly 210, a transmission mechanism 220, and a speed reduction mechanism 230. The speed reduction mechanism 230 is opposite the motor assembly 210. The transmission mechanism 220 is arranged between the motor assembly 210 and the speed reduction mechanism 230. The transmission mechanism 220 transmits mechanical power from the motor assembly 210 to the speed reduction mechanism 230. As shown in FIG. 5, an axis of rotation 230b of the output component 230a of the speed reduction mechanism 230 coincides with an axis of the motor assembly 210. The axes of rotation 230b of the output components 230a of the two speed reduction mechanisms 230 are skew or intersected with each other. In each actuating mechanism 200, the speed reduction mechanism 230 may include a connection shaft 332 fixed to the output component 230a, and a first sensor counterpart 330 is attached to an end of the connection shaft 332 which faces the motor assembly 210. The first sensors 340 are to detect angular displacements of the output components 230a of the speed reduction mechanisms 230 based on a change caused by rotation of the first sensor counterparts 330.

With such configuration, two actuating mechanisms 200 are incorporated into the housing 100, and can output rotational motion in two directions. The first sensors 330 cooperate with the first sensor counterparts 340 to detect the rotational information of the output components 230a of the speed reduction mechanisms 230 in real time. The rotational information is sent to a control system such that the control system can precisely control the output of motor shafts 212 of the motor assemblies without affecting assembly of the output components 230a of the speed reduction mechanisms 230 with external mechanisms. The servo has a simple structure, a high degree of integration, can be used in a modular manner, occupies a small space, and is low in cost.

In one embodiment, the first sensor counterparts 330 are magnets, and the first sensors 340 are magnetic encoding chips. When the output components 230a of the speed reduction mechanisms 230 rotate, the output components 230a, the connection shafts 332, and the magnets rotate synchronously. The rotation of the magnets will cause the change of the magnetic field strength. After the magnetic encoding chips detect the change in magnetic field strength, they convert the rotation of the magnets into pulse output to reflect the current rotational angle. In one embodiment, two first magnet holders 331 may be used hold the magnets in position. Specifically, the first magnet holders 331 can be directly or indirectly coaxially fixed to the output components 230a, and the magnets can be glued or fixed to the first magnet holders 331 in other manners.

In another embodiment, the first sensor counterparts 330 may be photoelectric code disk, and the first sensors 340 may be photoelectric detection devices. The photoelectric code disks are circular plates each defining a number of rectangular slots that are evenly distributed around axes of rotation of the circular plates. The photoelectric detection device may include a light-emitting diode and a phototransistor respectively arranged at opposite sides of the photoelectric code disk. When the output components 230a rotate, the output terminals 230a, the connecting shafts 332 and the photoelectric code disks rotate synchronously. During the rotation of the photoelectric code disks, the phototransistors can receive the light beam from the light-emitting diode that passes through some of the rectangular slots of the photoelectric code disk, and the photoelectric detection devices output several pulse signals. The rotational angle can be determined by counting the number of output pulses of the photoelectric detection devices.

Figure 3:
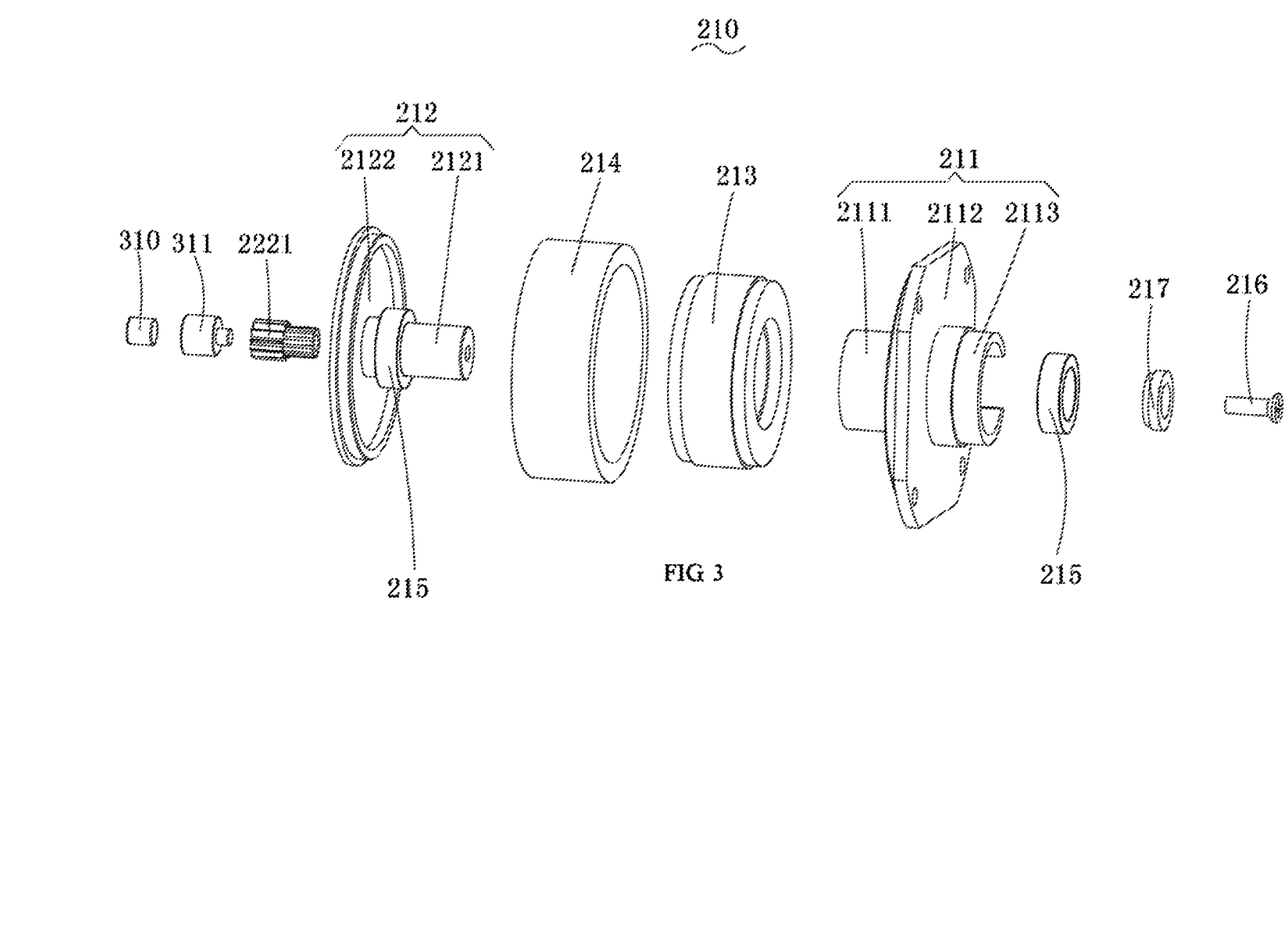
FIG. 3 is a schematic isometric exploded view of a motor assembly according to one embodiment.

Referring to FIGS. 2, 3, and 5, in one embodiment, each of the motor assemblies 210 may include a mounting base 211 arranged in the housing 100, the motor shaft 212 rotatably mounted on the mounting base 211, a stator 213 fixed to the mounting base 211, and a rotor 214 fixed to the motor shaft 212. The stator 213 is coaxial with respect to the rotor 214. The motor shafts 212 of the two actuating mechanisms 200 are connected to the input components of the transmission mechanisms 220, respectively. The motor assemblies 210 are easy to assemble. When the motor assemblies 210 are energized, because of the rotating magnetic field of the stators 213, the rotors 214 will rotate relative to the stators 213, driving the motor shafts 212 to rotate to output mechanical power.

The opposite ends of each actuating mechanism 200 are respectively connected to different external mechanisms. For each driving mechanism 200, the mounting base 211 of the motor assembly 210 is used for rotational connection with a first external mechanism, and the output component 230a of the speed reduction mechanism 230 is used for fixed connection with a second external mechanism. In one embodiment, each mounting base 211 may include an assembly shaft 2113 arranged coaxially with a corresponding motor shaft 212. The assembly shaft 2113 may be supported by a connecting member fixed to the first external mechanism through a bearing. In this way, one end of the actuating mechanism 200 is rotatably connected with the first external mechanism. The output component 230a of one speed reduction mechanism 230 can be connected with the second external mechanism through a fastener, such that the other end of the actuating mechanism 200 can be securely connected with the second external mechanism. During operation, the mechanical power output by the motor assembly 210 is transmitted to the second external mechanism through the transmission mechanism 220 and the speed transmission mechanism 230, thereby driving the second external mechanism to rotate. The two actuating mechanisms 200 can operate in the same manner, which can drive different external mechanisms to rotate. In one embodiment, the axes of rotation 230b of the output components 230a of the speed reduction mechanisms 230 are coplanar and intersected with each other, which allows two different external mechanisms to rotate about two axes in the same plane.

Referring to FIGS. 3 and 5, in one embodiment, each mounting base 211 may include a barrel 2111 and a flange 2112 that protrudes from and is arranged around a lateral surface of the barrel 2111 and is fixed to the housing 100. Each motor shaft 212 includes a shaft 2121 and a disc 2122 formed at an end of the shaft 2121. The shaft 2121 is rotatably received in a corresponding barrel 2111 through a bearing 215. The stator 213 of one motor assembly 210 is securely arranged around the lateral surface of a corresponding barrel 2111. The rotor 214 of one motor assembly 210 is arranged around a corresponding stator 213, and one end of the rotor 214 is fixed to a corresponding disc 2122. In one embodiment, the motor assemblies 210 are outer rotor motors, that is, the rotors 214 are arranged around the outer circumference of the stators 213. For each motor assembly 210, its rotor 214 is located between the inner surface of the housing 100 and the outer surface of its stator 213. A gap is formed between the rotor 214 and the inner surface of the housing 100, and between the rotor 214 and the outer surface of the stator 213, which allows the rotor 214 to rotate smoothly. With such configuration, the structure is simple and compact, and the parts are easy to manufacture and assemble. The barrels 2111 of the mounting bases 211 and the stators 213 may be connected to each other by adhesive. The flanges 2112 of the two motor assemblies 210 are fixed to the housing 100 and cover open ends of first receiving holes 100 of the housing 100 where the two motor assemblies 210 are partly received. The rotors 214 and the flanges 2122 of the motor shafts 212 may be connected to each other by adhesive or other connection means. The ends of the shafts 2121 of the motor shafts 212 are fixed to end cover 217 by screws 216. The end covers 217 are axially pressed against the inner rings of the bearings 215.

Referring to FIGS. 2 and 5, in one embodiment, the housing 100 further includes two second sensors 320, the two actuating mechanisms 200 include two second sensor counterparts 310 attached to ends of the motor shafts 212 facing the speed reduction mechanisms 230. The second sensors 320 are to detect angular displacements of the motor shafts 212 based on a change caused by rotation of the second sensor counterparts 310. The second sensors 320 cooperate with the second sensor counterparts 310 to detect the rotational information of the motor shafts 212 in real time. The rotational information is sent to a control system such that the control system can precisely control the output of motor shafts 212. The second sensors 320 and the second sensor counterparts 310 may operate in a manner similar to the first sensors 340 and the first sensor counterparts 330. That is, the second sensors 320 and the second sensor counterparts 310 may be magnetic encoding chips and magnets, or photoelectric detection devices and phototransistors. The second sensor counterparts 310 are arranged at the ends of the motor shafts 212 facing the speed reduction mechanisms 230, which can realize the angular displacement detection of the motor shafts 212 without affecting the assembly of the mounting base 211 with external mechanisms. When the second sensors 320 and the second sensor counterparts 310 are magnetic encoding chips and magnets, second magnet holders 311 can be directly or indirectly coaxially fixed to the motor shafts 212, and the magnets can be glued to or fixed to the second magnet holders 311 in other manners.

Referring to FIGS. 2 and 5, in one embodiment, each of the transmission mechanisms 220 includes a transmission shaft 221 rotatably connected to the housing 100, a first transmission structure 222, and a second transmission structure 223. An axis of the transmission shaft 221 is parallel to an axis of an input component of a corresponding speed reduction mechanism 230. The first transmission structures 222 are connected to the motor shafts 212 of the motor assemblies 210 and first ends of the transmission shafts 221, and transmit mechanical power from the motor assemblies 210 to the transmission shafts 221. The second transmission structures 223 are connected to second ends of the transmission shafts 221 and the input components of the speed reduction mechanisms 230, and transmit mechanical power from the transmission shafts 221 to the speed reduction mechanisms 230. With such configuration, coaxial transmission between the motor shafts 212 and the input components of the speed reduction mechanisms 230 can be realized, and the transmission shafts 221 can avoid the space between the motor shafts 212 and the input components of the speed reduction mechanisms 230 in the radial direction of the motor shaft 212. Additionally, the two actuating mechanisms 200 are integrated in the same housing 100, and the transmission routes of the two actuating mechanisms 200 do not interfere with each other, achieving high level of reliability. The transmission shafts 221 can be supported on the housing 100 through two pairs of bearings 224, such that the transmission shafts 221 can rotate stably and reliably.

In one embodiment, the first transmission structures 222 and second transmission structures 223 may have different or the same configurations. Each of the first transmission structures 222 and the second transmission structures 223 may include one of a gear transmission structure, a synchronous belt transmission structure, and a chain transmission structure. These transmission structures can transmit the mechanical power from the motor assemblies 210 to the speed reduction mechanisms 230.

Referring to FIGS. 2 and 5, in one embodiment, the first transmission structures 222 are gear transmission structures. Each of the gear transmission structures may include an output gear 2221 coaxially connected to a corresponding motor shaft 212, and a first transmission gear 2222 mounted on the first end of a corresponding transmission shaft 221. The output gear 2221 meshes with the first transmission gear 2222. The second transmission structures 223 are gear transmission structure. Each of the second transmission structures 223 includes an input gear 2231 coaxially connected to the input component of a corresponding speed reduction mechanism 230, and a second transmission gear 2232 mounted on the second end of the corresponding transmission shaft 221. The input gear 2231 meshes with the second transmission gear 2232. With such configuration, the coaxial transmission between the motor shafts 212 and the input components of the speed reduction mechanisms 230 can be realized. It can reduce the loss of precision and have a compact structure by adopting the gear transmission structures. By setting an appropriate gear ratio, the reduction ratio of the actuating mechanisms 200 can be adjusted. The output gears 2221 may be connected to the motor shafts 212 by interference press fitting, adhesive or other connection techniques.

In another embodiment, the first transmission structures are synchronous belt transmission structures. Each of the first transmission structures may include a first pulley coaxially connected to a corresponding motor shaft, a second pulley mounted on one end of a corresponding transmission shaft, and a timing belt wound around the first pulley and the second pulley. Similarly, the second transmission structures are synchronous belt transmission structures. With such configuration, the coaxial transmission between the motor shafts and the input components of the speed reduction mechanisms can be realized.

In one embodiment, each of the speed reduction mechanisms 230 may include one of a harmonic reducer, a planetary gear reducer, and a cycloid speed reducer. These mechanisms can achieve the effect of speed reduction and increasing torque, and they can be selected according to actual needs.

Figure 4:
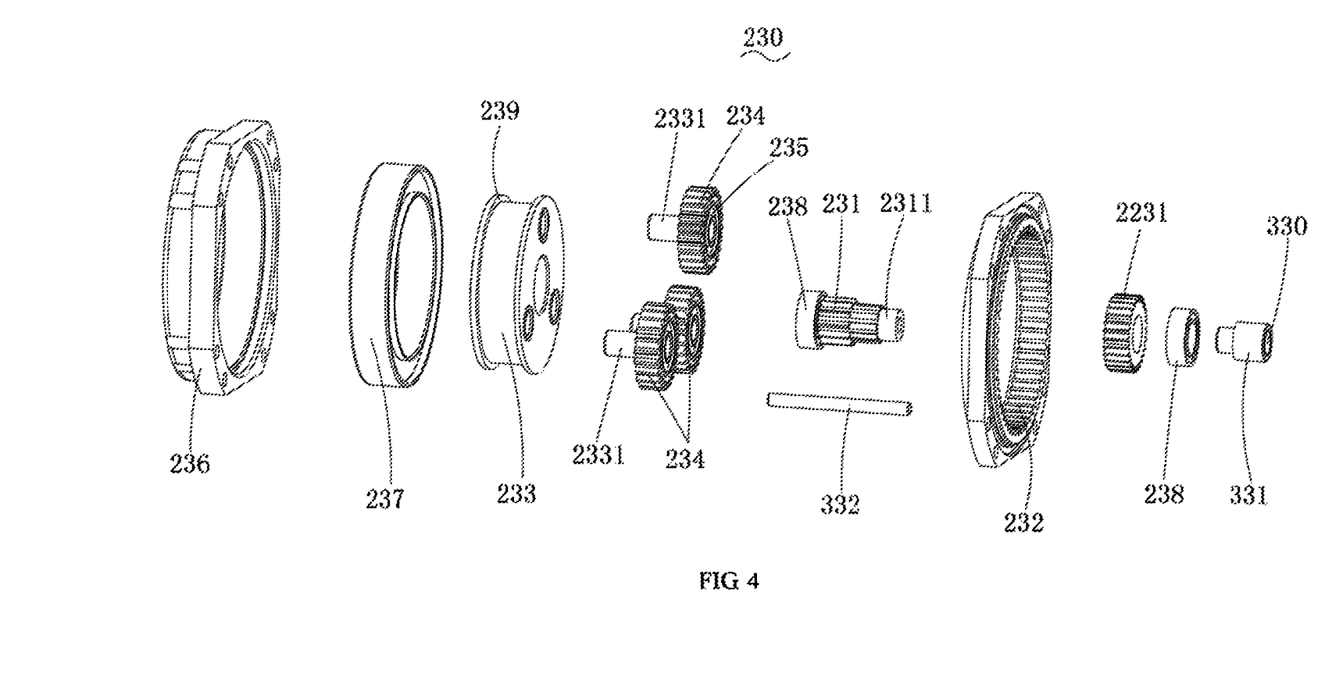
FIG. 4 is a schematic isometric exploded view of a speed reduction mechanism according to one embodiment.

Referring to FIGS. 4 and 5, in one embodiment, each of the speed reduction mechanisms 230 may include a sun gear 231 driven by a corresponding transmission mechanism 220, an inner ring gear 232 fixed to the housing 100, a planet carrier 233 rotatably connected to the housing 100, and a number of planet gears 234 rotatably connected to the planet carrier 233. The planetary gears 234 mesh with the sun gear 231 and the ring gear 232. The sun gears 231 of the speed reduction mechanisms 230 serve as input components of speed reduction mechanisms 230. The planet carriers 233 of the speed reduction mechanisms 230 serve as output components 230a of the speed reduction mechanisms 230. The planet carriers 233 are cylindrical and are to connect with external mechanisms. The mechanical power of the motor assemblies 210 is transmitted to the input components of the speed reduction mechanisms 230 through the transmission mechanisms 220. The rotation of the sun gear 231 drives the planetary gears 234 to revolve and rotate, thereby driving the planet carrier 233 to rotate to output mechanical power. The planetary reduction assemblies 230 have a compact structure and can achieve a large reduction ratio.

When assembling each reduction assembly 230, the planet carrier 233 is provided with a number of pins 2331, and the axis of the planet carrier 233, the axes of the pins 2331, and the axis of the planetary gears 234 are parallel to one another. The planetary gears 234 are connected to the pins 2331 through the bearings 235, respectively, such that the planetary gears 234 are rotatably mounted on the planet carrier 233. The pins 2331 can be fixed to the planet carrier 233 by interference press fitting. The ring gears 232 are mounted in second receiving holes 102 of the housing 100. An annular shell 236 is connected to each ring gear 232. The planet gears 234, the sun gear 231 and the ring gear 232 are coplanar. The planet carriers 233 are supported in the annular shells 236 through the bearings 237. Opposite ends of the inner ring of each bearing 237 are respectively abutted against the outer rim of a corresponding planet carrier 233 and a locking ring 239, which prevents axial movement of the inner ring. The locking rings 239 can be fixed on the outer circumference of the planet carriers 233 by interference press fitting. Opposite ends of the outer ring of each bearing 237 abut against the end surface of a corresponding inner ring gear 232 and an annular surface of a corresponding annular shell 236, which prevents axial movement of the outer ring. Finally, the annular shell 236, the inner ring gear 232 and the housing 100 are fixed together by fasteners.

Referring to FIGS. 4 and 5, in one embodiment, the sun gear 231 has a support shaft 2311, and opposite ends of the support shaft 2311 are connected to the housing 100 and the planet carrier 233 through second bearings 238, respectively. This facilitates the stable and reliable rotation of the sun gear 231 relative to the housing 100. When the second transmission structures 223 are gear transmission structures, the input gear 2231 and the support shaft 2311 can be connected to each other by interference press fitting.

In one embodiment, the side of the planet carrier 233 facing a corresponding motor assembly 210 is coaxially provided with a connection shaft 332 passing through the sun gear 231. One first magnet holder 331 is fixed at one end of the connection shaft 332, and a magnet is arranged in the first magnet holder 331. The position detection of the output components 230a of the speed reduction mechanisms 230 can be realized using magnetic encoding chips and the magnets in the first magnet holders 331.

Referring to FIGS. 1 and 5, in one embodiment, an angle between the axes of rotation 230b of the output components 230a of the speed reduction mechanisms 200 is in a range between 60 degrees to 120 degrees. the axes of the two actuating mechanisms 200 can change according to different requirements. For example, the two driving mechanisms 200 may be arranged orthogonally, that is, the angle between axes of rotation 230b of the output components 230a of the speed reduction mechanisms 200 is 90°.

Referring to FIGS. 2 and 5, in one embodiment, the housing 100 defines two first receiving holes 101, two second receiving holes 102 that are opposite the first receiving holes 101, and a third receiving hole 103 in communication with the first receiving holes 101 and the second receiving holes 102. In one embodiment, one of the first receiving holes 101 and one of the second receiving holes 102 extend along a direction that is perpendicular to a direction in which the other of the first receiving holes 101 and the other of the second receiving holes 102 extend. The two motor assemblies 210 are partly received in the two first receiving holes 101, respectively. The two speed reduction mechanisms 230 are partly received in the two second receiving holes 102, respectively. The two transmission mechanisms 220 are partly received in the third receiving hole 103. This configuration is easy to assemble, has a compact overall structure and a high degree of integration.

In one embodiment, the first sensor 340, the first sensor counterpart 330, the second sensor 320, and the second sensor counterpart 310 may be arranged in the third receiving hole 103. In this way, the angular displacement detection of the output components 230a of the speed reduction mechanisms 230 and the motor shafts 212 can be realized without affecting the assembly of the servo with external mechanisms. In one embodiment, the first sensor 340 and the second sensor 320 are both magnetic encoding chips, and can be mounted on circuit boards 350 fixed to the housing 100. The first sensor counterpart 330 and the second sensor counterpart 310 are both magnets arranged adjacent to the third receiving hole 103 so as to realize angular displacement detection.

In one embodiment, a robot may include the servo discussed above. Since this robot includes all the features described above, it also has all the beneficial effects brought about by the technical solutions of the aforementioned embodiments, which will not be repeated here.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A dual-output-shaft servo, comprising:
a housing comprising two first sensors; and
two actuating mechanisms, each of the two actuating mechanisms comprising:
a motor assembly;
a speed reduction mechanism opposite the motor assembly, the speed reduction mechanism comprising an output component, a connection shaft fixed to the output component, a first sensor counterpart attached to an end of the connection shaft which faces the motor assembly, an axis of rotation of the output component of the speed reduction mechanism coinciding with an axis of the motor assembly; and
a transmission mechanism arranged between the motor assembly and the speed reduction mechanism, the transmission mechanism configured to transmit mechanical power from the motor assembly to the speed reduction mechanism;
wherein the first sensors are configured to detect angular displacements of the output components of the speed reduction mechanisms based on a change caused by rotation of the first sensor counterparts; the axes of rotation of the output components of the speed reduction mechanisms are skew or intersected with each other;
wherein each of the motor assemblies comprises a mounting base arranged in the housing, a motor shaft rotatably mounted on the mounting base, a stator fixed to the mounting base, and a rotor fixed to the motor shaft, the stator is coaxial with respect to the rotor, and the motor shafts of the two actuating mechanisms are connected to the transmission mechanisms, respectively;
wherein the mounting base comprises a barrel and a flange that protrudes from and is arranged around a lateral surface of the barrel and is fixed to the housing; the motor shaft comprises a shaft and a disc formed at an end of the shaft, the shaft is rotatably received in the barrel through a bearing, the stator is securely arranged around the lateral surface of the barrel, the rotor is arranged around the stator, and one end of the rotor is fixed to the disc.

2. The servo of claim 1, wherein each of the transmission mechanisms comprises a transmission shaft rotatably connected to the housing, a first transmission structure, and a second transmission structure, an axis of the transmission shaft is parallel to an axis of an input component of a corresponding speed reduction mechanism;
the first transmission structures are connected to the motor shafts of the motor assemblies and first ends of the transmission shafts, and are configured to transmit mechanical power from the motor assemblies to the transmission shafts;
the second transmission structures are connected to second ends of the transmission shafts and the input components of the speed reduction mechanisms, and are configured to transmit mechanical power from the transmission shafts to the speed reduction mechanisms.

3. The servo of claim 2, wherein each of the first transmission structures and the second transmission structures comprises a gear transmission structure.

4. The servo of claim 1, wherein each of the speed reduction mechanisms comprises a planetary gear reducer.

5. The servo of claim 1, wherein each of the speed reduction mechanisms comprises a sun gear driven by a corresponding one of the transmission mechanisms, an inner ring gear fixed to the housing, a planet carrier rotatably connected to the housing, and a plurality of planet gears rotatably connected to the planet carrier, the plurality of planetary gears are meshed with the sun gear and the ring gear, the sun gears of the speed reduction mechanisms serve as input components of speed reduction mechanisms, and the planet carriers of the speed reduction mechanisms serve as output components of the speed reduction mechanisms.

6. The servo of claim 5, further comprising two support shafts, wherein the sun gears are respectively fixed to the support shafts, respectively, the support shafts are rotatably connected to the housing and the planet carriers through bearings.

7. The servo of claim 1, wherein an angle between the axes of rotation of the output components of the speed reduction mechanisms is in a range between 60 degrees to 120 degrees.

8. The servo of claim 1, wherein the housing defines two first receiving holes, two second receiving holes that are opposite the first receiving holes, and a third receiving hole in communication with the first receiving holes and the second receiving holes, the two motor assemblies are partly received in the two first receiving holes, respectively, the two speed reduction mechanisms are partly received in the two second receiving holes, respectively, and the two transmission mechanisms are partly received in the third receiving hole.

9. A robot comprising:
a dual-output-shaft servo, comprising:
   a housing comprising two first sensors; and
   two actuating mechanisms, each of the two actuating mechanisms comprising:
   a motor assembly;
   a speed reduction mechanism opposite the motor assembly, the speed reduction mechanism comprising an output component, a connection shaft fixed to the output component, a first sensor counterpart attached to an end of the connection shaft which faces the motor assembly, an axis of rotation of the output component of the speed reduction mechanism coinciding with an axis of the motor assembly; and
   a transmission mechanism arranged between the motor assembly and the speed reduction mechanism, the transmission mechanism configured to transmit mechanical power from the motor assembly to the speed reduction mechanism;
wherein the first sensors are configured to detect angular displacements of the output components of the speed reduction mechanisms based on a change caused by rotation of the first sensor counterparts; the axes of rotation of the output components of the speed reduction mechanisms are skew or intersected with each other;
wherein each of the motor assemblies comprises a mounting base arranged in the housing, a motor shaft rotatably mounted on the mounting base, a stator fixed to the mounting base, and a rotor fixed to the motor shaft, the stator is coaxial with respect to the rotor, and the motor shafts of the two actuating mechanisms are connected to the transmission mechanisms, respectively;
wherein the mounting base comprises a barrel and a flange that protrudes from and is arranged around a lateral surface of the barrel and is fixed to the housing; the motor shaft comprises a shaft and a disc formed at an end of the shaft, the shaft is rotatably received in the barrel through a bearing, the stator is securely arranged around the lateral surface of the barrel, the rotor is arranged around the stator, and one end of the rotor is fixed to the disc.

10. The robot of claim 9, wherein the housing further comprises two second sensor, the two actuating mechanisms comprise two second sensor counterparts attached to ends of the motor shafts facing the speed reduction mechanisms, the second sensors are configured to detect angular displacements of the motor shafts based on a change caused by rotation of the second sensor counterparts.

11. The robot of claim 9, wherein each of the transmission mechanisms comprises a transmission shaft rotatably connected to the housing, a first transmission structure, and a second transmission structure, an axis of the transmission shaft is parallel to an axis of an input component of a corresponding speed reduction mechanism;
the first transmission structures are connected to the motor shafts of the motor assemblies and first ends of the transmission shafts, and are configured to transmit mechanical power from the motor assemblies to the transmission shafts;
the second transmission structures are connected to second ends of the transmission shafts and the input components of the speed reduction mechanisms, and are configured to transmit mechanical power from the transmission shafts to the speed reduction mechanisms.

12. The robot of claim 11, wherein each of the first transmission structures and the second transmission structures comprises a gear transmission structure.

13. The robot of claim 9, wherein each of the speed reduction mechanisms comprises a planetary gear reducer.

14. The robot of claim 9, wherein each of the speed reduction mechanisms comprises a sun gear driven by a corresponding one of the transmission mechanisms, an inner ring gear fixed to the housing, a planet carrier rotatably connected to the housing, and a plurality of planet gears rotatably connected to the planet carrier, the plurality of planetary gears are meshed with the sun gear and the ring gear, the sun gears of the speed reduction mechanisms serve as input components of speed reduction mechanisms, and the planet carriers of the speed reduction mechanisms serve as output components of the speed reduction mechanisms.

15. The robot of claim 14, further comprising two support shafts, wherein the sun gears are respectively fixed to the support shafts, respectively, the support shafts are rotatably connected to the housing and the planet carriers through bearings.

16. A dual-output-shaft servo, comprising:
a housing comprising two first sensors; and
two actuating mechanisms, each of the two actuating mechanisms comprising:
   a motor assembly;
   a speed reduction mechanism opposite the motor assembly, the speed reduction mechanism comprising an output component, a connection shaft fixed to the output component, a first sensor counterpart attached to an end of the connection shaft which faces the motor assembly, an axis of rotation of the output component of the speed reduction mechanism coinciding with an axis of the motor assembly; and
   a transmission mechanism arranged between the motor assembly and the speed reduction mechanism, the transmission mechanism configured to transmit mechanical power from the motor assembly to the speed reduction mechanism;
wherein the first sensors are configured to detect angular displacements of the output components of the speed reduction mechanisms based on a change caused by rotation of the first sensor counterparts; the axes of rotation of the output components of the speed reduction mechanisms are skew or intersected with each other;
wherein the housing further comprises two second sensor, the two actuating mechanisms comprise two second sensor counterparts attached to ends of the motor shafts facing the speed reduction mechanisms, the second sensors are configured to detect angular displacements of the motor shafts based on a change caused by rotation of the second sensor counterparts.

* * * * *